United States Patent Office 2,874,897
Patented Feb. 24, 1959

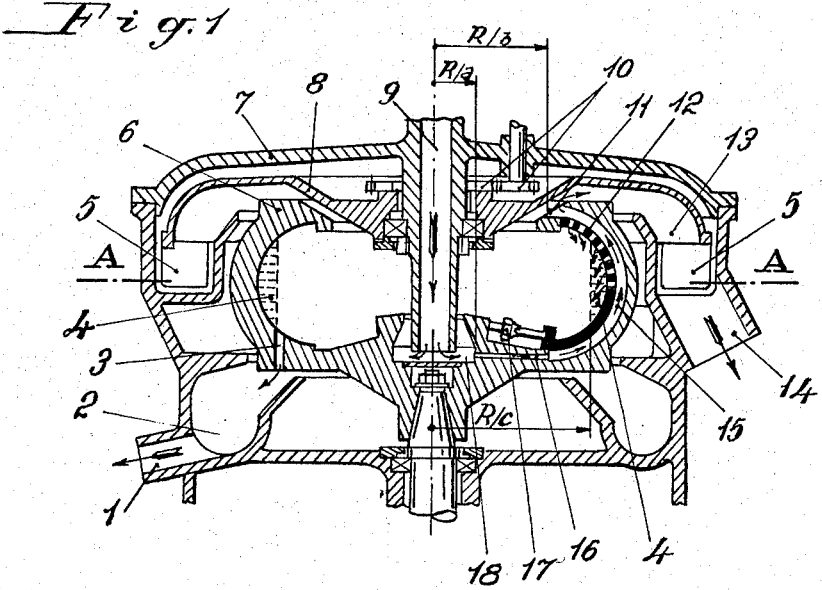
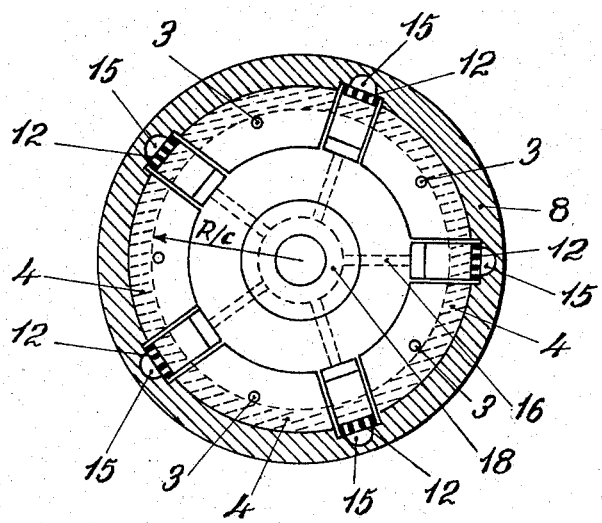

2,874,897

PROCESS AND APPARATUS FOR THE CONTINUOUS CENTRIFUGAL SEPARATION OF LIQUIDS FROM SUBSTANCES OF HIGHER DENSITY

Alberto Corteggiani, Rome, Italy

Application April 25, 1956, Serial No. 580,510

Claims priority, application Italy May 6, 1955

9 Claims. (Cl. 233—17)

The present invention relates to a process and an apparatus for the continuous centrifugal separation of liquids from substances of higher density, and particularly to the continuous centrifugal separation of oily liquids from doughy or muddy substances.

Several attempts of centrifguation, with continuously operationg apparatus, of doughy or muddy materials and olive or other fruit doughs for separating the liquid substances contained therein, were hitherto not effective, because of the employment of apparatus which operated in the manner previously employed for the continuous centrifugal separation of mixtures, suspensions or emulsions of liquid substances of different density.

The prior centrifugal separators essentially consist of a dispenser of the material to be treated and a separation chamber from which, the two main liquids separated are removed through two different outlets. In these prior separators the material supplied to the separation chamber is so disposed by the centrifugal force that the components of higher density decant in the zone farther from the rotation axis and the components of lower density assemble in the zone nearer to said axis.

The discharge of the liquids of lower density from the separation chamber occurs through an outlet formed in the separation drum at a predteminated, fixed distance from the rotation axis so as to limit the thickness of the annular layer of the material contained in the separation chamber.

The discharge of the liquid substances of higher density occurs through a flue that starts from the outer peripheral zone of the separation chamber, turns toward the rotation axis and terminates at the outside of the separation chamber at an outlet opening spaced from the rotation axis by a distance substantially greater than the distance from said axis of the outlet for the liquids of lower density.

It is apparent that the path through the discharge flue for the liquids of higher density causes the material flowing therein to effect changes of direction, so as to affect negatively the flow of the material, when it has a different consistency from liquid substances.

It is well known, in fact, that liquids transmit the pressure exerted thereon in all directions; therefore for the liquids the pressure remains the same throughout the flue in which the changes in the direction of movement takes place.

On the contrary when a material resulting from the decantation of doughs or muds (i. e. essentially consisting of solid particles agglomerated by little amounts of plastic and liquid substances) is made to flow in a direction different from the direction of the pressure exerted thereon, a reduced pressure is transmitted, the reduction in the transmitted pressure depending on a coefficient which is widely variable according to the consistency and the degree of granulation of the material and is always less than one.

Therefore, when a semisolid decanted material flows in a flue having the previously described shape, the pressure reduction occurring because of the various consecutive changes of direction (particularly in the curved portion connecting the flue with the separation chamber) is not only considerable, but is also variable since it is proportional to the widely variable consistency of the discharged material.

Furthermore, on varying the consistency and sometimes also the quality of the decanted material, the resistance to the flow of the material also varies, said resistance being caused by the friction of the material on the walls of the flue.

From what has been mentioned above, it will be easily understood that it is not possible to provide a continuous and regular operation for treating doughy materials by means of an apparatus in which the material is caused to flow in the discharge flue by a centrifugal force of constant value, since said force is exerted by the thickness of material that fills the separation chamber to and not beyond the point corresponding to the outlet for the components of lower density.

In order to avoid this serious drawback, centrifugal apparatus for the treatment of muddy or doughy substances have been provided with mechanical conveying means for the material to be decanted but such mechanical conveying means are not an adequate solution, in that the rotary equipment is made more complicated and different adjustment by the operator is required.

The present invention relates to an apparatus for treating doughy or muddy materials of variable consistency and with high contents of solid substances, and to a process which assures the continuous and regular operation thereof.

The process of the present invention is characterized by the automatic and continuous adjustment of the centrifgual force which causes the treated material to flow along its entire path in the rotary equipment, such adjustment being individually effected for each of the several flues to which the material is supplied.

The present invention is characterized also by other provisions which integrate the above mentioned main features and are hereinafter described:

As distinguished from the operation of the prior separators, according to the process of the present invention the material to be treated is conveyed through several separating flues each of which is fed independently through a related feeding pipe that starts from a central dispenser common to all of the feeding pipes which are arranged radially and equally spaced apart.

The outer radius of the dispenser at the inlet of the material to the feeding pipes is considerably less than the corresponding radius of the discharge openings of the separating flues, and these two radii have suitable lengths as to allow the accumulation of the material coming from the dispenser in the space resulting from the difference between the said two radii. This accumulation occurs independently in each feeding pipe until the centrifugal force of the accumulated mass is suitable to overcome the flow resistance that the material then encounters in the corresponding separating flue.

The separating flues are curved and shaped so that the last part of the flow of the treated material therein occurs in a direction toward the rotation axis, and at least the portion of the flue wall closest to the rotation axis consists of a filtering medium through which the liquids separated by centrifugation of the material during flow through the flue are removed. Each of the flues terminates in a discharge mouth at the outside of the rotary equipment, so that each flue operates both as a separation chamber and a discharge flue for the decanted materials.

The cross-sectional are of the feeding pipes is constant along the length thereof and is equal to or less than the cross-sectional area of the separating flue, while the cross-sectional area of the latter is constant or gradually increases in the direction of flow of the material up to and including the discharge mouths so as to avoid any reduction of cross-section which would hinder the flow of material when it has a considerable consistency due to the separation of the liquids therefrom.

The cross-sectional area and the shape of the separating flues are suitably designed according to the quality and the degree of granulation of the material to be treated. The cross-sectional area of each flue is reduced to the minimum size so as to reduce the thickness of the material during the decantation and to avoid relative slipping movements of layers of decanted material.

The dispenser, the feeding pipes and the corresponding separating flues are all assembled as a rotary unit in the form of a circular tank in which the separated liquids removed from the separating flues through the filtering walls are collected in an annular layer. The inner radius of the layer of liquids in the tank is determined and limited by the location of suitable outlets through which the liquids are drawn to the outside, said outlets being located at a distance from the axis of rotation which is greater than the radial distance from such axis to the discharge mouths of the separating flues. This feature is quite different from the prior apparatus, wherein the outlets for the liquids of lower density are always at a distance from the axis of rotation which is less than the radial distance to the discharge mouths for the decanted materials of higher density.

In the accompanying drawings there is shown an illustrative embodiment of the invention.

In the drawings:

Figure 1 is an axial section of a centrifugal separating apparatus embodying the invention; and Figure 2 is a sectional view of the rotary drum of the apparatus of Fig. 1 taken along the line A—A of Figure 1.

In this apparatus embodying the present invention, the material to be treated is conveyed to the rotary drum 6 through an axially extending, central pipe 9 by a spiral wheel or other means (not shown) suitable to control the flow and enters a circular dispensing chamber 18 from which it is uniformly suplied to the feeding pipes 16 that are arranged radially and at equal distances from each other.

Each feeding pipe 16 is directly connected with a separating flue 15 which terminates with a discharge mouth 11. The material is urged by the centrifugal force from the chamber 18 and fills separating flues 15, through which it flows to the discharge mouths 11, where the material is thrown radially out into an annular collector 13.

During the flow through the separating flues 15 the solid components of higher density decant and move toward the outer zone of the flues 15, while the liquid components of lower density assemble in the inner zone, that is, along the inner wall 12.

The wall 12 is formed, at least in the portion thereof near to the discharge mouths 11, of a filtering medium through which the separated liquids pass into the chamber formed by the rotary drum 6 where the liquids form an annular layer 4 (as shown in the drawings) having a thickness determined by the location of outlets 3 through which the liquids are thrown into a liquids collector 2 which surrounds the bottom of drum 6 and has a discharge opening 1.

As clearly shown in the drawings, the radial distance from the axis of rotation of drum 6 to the inlet ends of the feeding pipes 16, indicated at R/a, is considerably less than the radial distance R/b to the discharge mouths 11 of the separating flues 15 so that, when the resistance to the flow increases in any one of the separating flues, the material accumulates in the corresponding feeding pipe in the space resulting from the difference between the radial distance R/a and R/b, thereby increasing the column of material in the feeding pipe and correspondingly increasing the centrifugal force until it reaches a value sufficient to overcome the resistance to the flow occurring in the separating flue.

Thus, there is obtained both the continuous and automatic adjustment of the centrifugal force produced by the amount of material contained in each feeding pipe according to the resistance to the flow encountered in the corresponding separating flue, and accurate distribution of the material among all the separating flues is achieved.

In order to simplify the drawings, the right hand half of Fig. 1 shows only one separating flue together with the corresponding feeding pipe, while the left hand half of that view shows only one outlet for the liquids. In Fig. 2 there are shown five separating flues 15 and five outlets 3 for the liquids arranged alternately around the drum.

However, in a practical embodiment of the invention, the separating flues and the corresponding feeding pipes are preferably arranged two by two at diametrally opposed locations, and the number thereof is the maximum allowed by the diameters of each part of the rotary equipment as well as by the sizes of the flues.

The filtering wall 12 is diagrammatically shown as a detachable curved blade provided with perforations in the last portion of the flue and kept in place by the screw 17, but it is to be understood that filtering wall 12 may also consist of non-rigid filtering materials, such as fabrics or thin perforated blades, suitably supported and applied to the rotary equipment by any means known in the filtration art, provided that their tightness is assured during the operation.

The radial distance R/c from the axis of rotation to the inner surface of the annular layer 4 of the liquids is greater than the radial distance R/b to the discharge mouths 11 of the separating flues 15, and is determinated by the radial location of outlets 3.

The liquid layer 4 exerts on the filtering surfaces of the walls 12 a centrifugal force which is proportional to the thickness of the layer, and which opposes the greater pressure existing in the separating flues 15.

Depending upon the material being treated, the surface area and the location of the wall 12 which operates as a filter, and the kind of filtering material used, it may be necessary to control or to substantially eliminate the centrifugal force resulting from the liquids layer 4. For this purpose the liquids outlets 3 are located in several concentric circularly arranged series at different radial distances from the axis of rotation which are all larger than the radial distance R/b, and only the outlets of the circular series corresponding to the desired liquid layer thickness are kept open. Alternatively, the outlets 3 may be located of the maximum possible radial distance from the axis of rotation, and provided with pipes that may be prolonged or oriented to vary the radial distance from the open ends of such pipes, which pick-up the liquids, to the axis of rotation.

Fig. 1 also clearly shows the mechanical means which conveys to the outside of the apparatus the decanted materials coming from the separating flues during operation of the centrifugal separator.

Such mechanical means consists of the disc 8 rotatably mounted on the main feeding tube 9, and rotated about the latter by a gear transmission 10. The disc 8 is provided with buckets 5 which move slowly in an annular collecting chamber 13 and drag the decanted material until the latter falls into the discharge mouth 14. Such mechanical means is connected to a cover 7 and may be taken out when the cover 7 is removed so as to allow the inspection of all of the operating parts of the apparatus.

The above described apparatus is only a particular embodiment of the present invention; and it will be understood that variations, modifications and rearrangements may be effected therein by a person skilled in the art, without departing from the scope of the present invention.

For instance, although the described apparatus has filtering surfaces preferably formed by the walls of the separating flues (or parts thereof) which face toward the rotation axis, i. e. the walls that limit the zone of the flues toward which the liquids move as a result of the centrifugal force, the separating flues can be wholly formed by filtering walls, and the walls of the feeding pipes can also be formed by filtering means, if the treated material permits filtration under pressure, in addition to the centrifugal filtration.

In any case, the filtering walls may consist of any of the well known filtering media, such as fabrics of animal, vegetable, metallic or synthetic fibres, or perforated plates of any material, suitable to the characteristics of the material to be treated.

What is claimed is:

1. In a process for the continuous centrifugal separation of liquids from substances of higher density, particularly of oily liquids from doughy or muddy substances, the steps of centrifuging the material to be treated, dividing said material into separated currents at the beginning of the rotation, causing said currents to follow independent paths having a curved shape and a cross-sectional area that avoids reductions in the direction of movement of said currents along said paths up to and including the outlet ends of the latter so as to allow independent centrifugal separation in each of said currents, controlling continuously in automatic, autonomous and independent manner the centrifugal force which advances each current, and collecting the liquids separated from each of said currents.

2. In a centrifuge for effecting the continuous separation of liquids from substances of higher density contained in a heterogeneous material, and which is of the type including means defining a plurality of independent passages for the material having inlet and outlet ends, means for dividing the heterogeneous material into separate currents entering said passages at the inlet ends of the latter, means centrifugally causing the movement of each of the currents of material along the related passage in the direction toward said outlet end of the latter while the liquids in the material are centrifugally separated from the substances of higher density in the latter, means for automatically controlling the centrifugal force causing the movement of each current along the related passage, and means for collecting the liquids separated from each of the currents of material moving along said passages; said passages curving between said ends and having cross-sectional areas which, at any point along each passage up to and including the outlet end thereof, is at least as large as the cross-sectional area at all locations along the passage between said point and said inlet end.

3. A centrifugal separator for separating liquids from substances of higher density contained in a heterogeneous material, comprising a rotated member having a distribution chamber at the center thereof and radial feeding pipes extending from said chamber, said rotated member further having separated flues lying in radial planes and each connected, at its radially inner end, to a related one of said feeding pipes and having a discharge end, and means for introducing the heterogeneous material to be separated into said chamber for uniform distribution to said feeding pipes and to the corresponding flues, so that rotation of said member centrifugally urges the distributed material along said pipes and the related flues with a force that varies in accordance with the frictional resistance to the flow of the material through each separating flue, to cause the substances of higher density to be continuously thrown out of said discharge ends of the flues, each of said flues being tubular and, adjacent said discharge end, curving back toward the center of the rotated member, and at least the portion of each flue adjacent said discharge end and facing toward said center having filtering means therein through which can escape liquids separated centrifugally from the solids of higher density during flow of the heterogeneous material through the flue.

4. A centrifugal separator for separating liquids from substances of higher density contained in a heterogeneous material, comprising a rotated member having a distribution chamber at the center thereof and radial feeding pipes extending from said chamber, said rotated member further having separating flues lying in radial planes and each connected, at its radially inner end, to a related one of said feeding pipes and having a discharge end, and means for introducing the heterogeneous material to be separated into said chamber for uniform distribution to said feeding pipes and to the corresponding flues, so that rotation of said member centrifugally urges the distributed material along said pipes and the related flues with a force that varies in accordance with the frictional resistance to the flow of the material through each separating flue, to cause the substances of higher density to be continuously thrown out of said discharge ends of the flues, each of said flues having a filtering wall portion facing toward the center of the rotated member through which liquids centrifugally separated from the solids of higher density during flow of the material through the flue can be collected.

5. A centrifugal separator for separating liquids from substances of higher density contained in a heterogeneous material, comprising a rotated member having a distribution chamber at the center thereof and radial feeding pipes extending from said chamber, said rotated member further having separating flues lying in radial planes and each connected, at its radially inner end, to a related one of said feeding pipes and having a discharge end, and means for introducing the heterogeneous material to be separated into said chamber for uniform distribution to said feeding pipes and to the corresponding flues, so that rotation of said member centrifugally urges the distributed material along said pipes and the related flues with a force that varies in accordance with the frictional resistance to the flow of the material through each separating flue, to cause the substances of higher density to be continuously thrown out of said discharge ends of the flues, said rotated member being in the form of a circular tank having said chamber centrally located at the bottom thereof, while said feeding pipes and flues are respectively defined in bottom and side walls of the circular tank so that the separated liquids collect in an annular layer against the side wall of said circular tank, said tank further having liquid discharge openings at the bottom of said side wall to determine the radial location of the inner surface of the annular layer of collected liquids.

6. A centrifugal separator as in claim 5; wherein said liquid discharge openings are radially adjustable for varying the radial thickness of the annular layer of collected liquids.

7. A centrifugal separator as in claim 5; further comprising means defining an annular chamber extending around said discharge ends of the flues or collecting the solids of higher density thrown out from said discharge ends and having a single outlet for the solids, and a relatively slowly rotated conveying member movable in said annular chamber for continuously moving the collected solids to said single outlet for the solids.

8. A centrifugal separator for separating liquids from substances of higher density contained in a heterogeneous material, comprising an annular member rotated about a central axis and having a radial wall and a peripheral wall of inwardly concave cross-section extending from said radial wall and terminating at a rim of smaller diameter than the maximum diameter of said peripheral wall, said annular member having a central distributing chamber in said radial wall, feed pipes extending radially in said radial wall from said distribution chamber and separating passages extending from said feed pipes through said peripheral wall and opening at said rim of the latter, said rim being disposed radially outward with respect to the radially inner ends of said feed pipes, means for supplying the heterogeneous material to said distribution chamber for separation into individual streams flowing through each feed pipe and related separating passage toward said rim by reason of the centrifugal force acting on the mass of material in each feed pipe and separating passage over the radial distance between said inner end of the feed pipe and said rim, and filtering means at the radially inner side of each separating passage at least along the portion of the latter adjacent said rim so that, as each individual stream of the mixture flows through the related separating passage in said peripheral wall, the liquids are separated from the solids of higher density and pass through said filtering means to collect in an annular layer against the inside of said peripheral wall, while the solids of higher density are discharged from said separating passages at said rim.

9. A centrifugal separator as in claim 8; wherein said annular member has liquid discharge openings disposed radially outward with respect to said rim to determine the thickness of the annular layer of liquid collected against said peripheral wall; and further comprising a stationary housing surrounding said rotated annular member and having solids and liquids collecting chambers into which said separating passages and said liquid discharge openings respectively open, said solids collecting chamber having a single outlet for the solids, and relatively slowly rotated conveyor means moving in said solids collecting chamber to convey the collected solids to said single outlet.

References Cited in the file of this patent

UNITED STATES PATENTS 935,311     Laist _____ Sept. 28, 1909